United States Patent Office 3,128,633
Patented Apr. 14, 1964

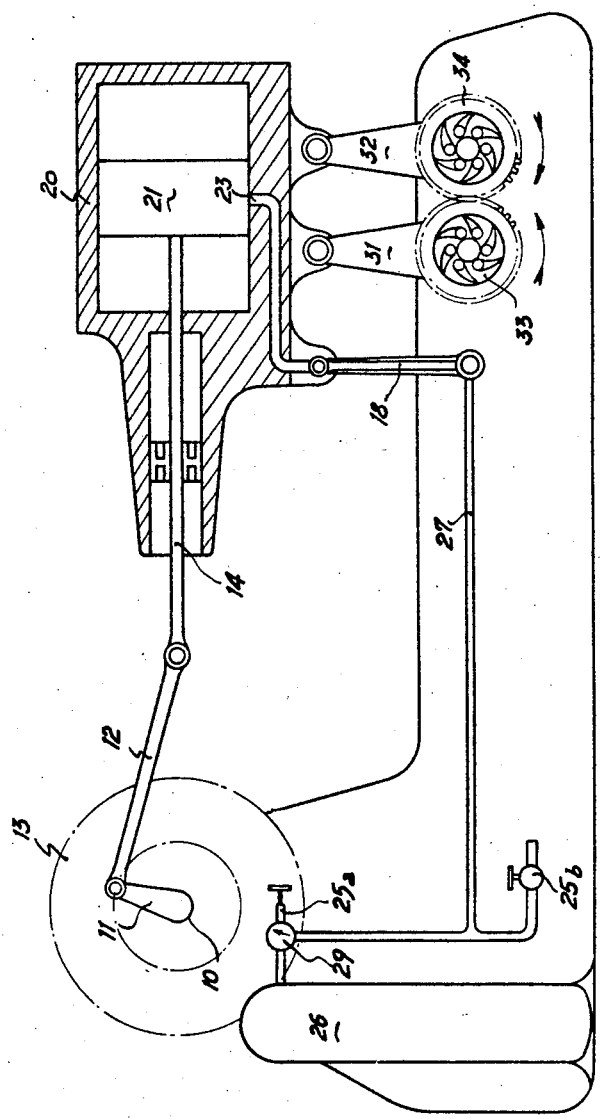

3,128,633
TORQUE CONVERTER
Jean Henri Bertin, Neuilly-sur-Seine, France, assignor to Societe Bertin & Cie, Paris, France, a company of France
Filed Sept. 18, 1961, Ser. No. 138,889
Claims priority, application France Oct. 1, 1960
2 Claims. (Cl. 74—116)

The invention relates to the force-transmitting mechanisms which are known as torque converters and, of these, to impulse-type converter mechanisms which make use of an elastic device or member.

The principle of these mechanisms is well known. A rotating shaft carries an impulse-generating mechanism; another shaft carries an impulse-receiving mechanism, provided with a system for controlling the direction of the said impulses. Between these two mechanisms, impulse generator and impulse receiver, there is situated an elastic device whose task is to modify the form in which it delivers to the second mechanism the force received from the first.

The elastic members used for this transformation present difficult constructional problems. In fact, the power which they transmit depends on their deformation and consequently on the geometric characteristics of the impulse generator, which generally has a variable stroke. On the other hand, the cyclic stresses entail a risk of their being fractured as a result of fatigue.

The invention has as its object to provide an impulse-type torque converter which is not subjected to the aforesaid disadvantages, which advantageously uses a fixed stroke impulse generator, and which is free of any risk of fracture of the elastic member owing to fatigue.

It consists essentially in using as the elastic means a compressed gas present in a piston-cylinder assembly, the regulatable pressure within which makes it possible to vary the specific force transmitted at each impulse.

It comprises advantageously at least one double-acting piston-cylinder assembly connecting known impulse-generating and impulse-receiving mechanisms, for example respectively a fixed-stroke crank and connecting rod assembly and an assembly comprising a slide and two cranks co-operating with free-wheel devices operating in opposite directions and coupled for rotation with one another by means of gearwheels, and finally means for supplying and regulating the pressure of the gas used as the elastic transmission means for the said impulses.

The following description relating to the accompanying drawings, given by way of non-limitative example, will make it easy to understand how the invention can be carried into effect, the features brought out both in the text and in the drawings being understood to form part of the said invention.

FIG. 2 is a diagrammatic sectional view of a modified form of embodiment.

Figure 1:
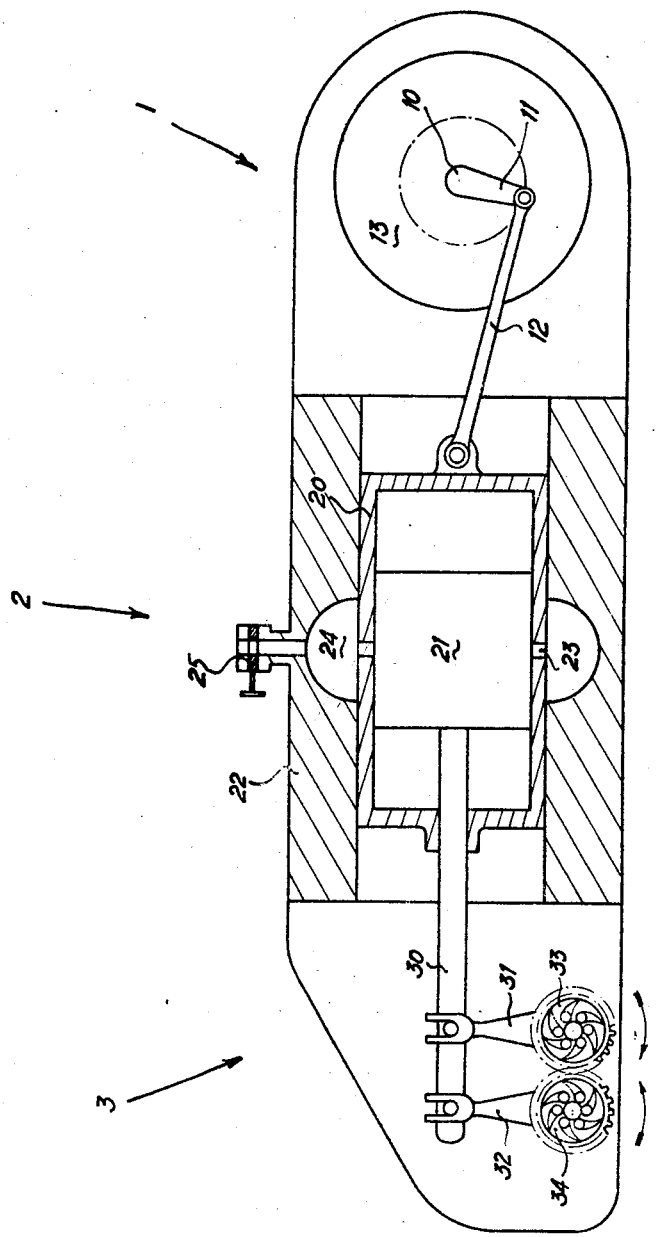
FIG. 1 is a diagrammatic sectional view of an impulse-type torque converter unit according to the invention.

With reference to FIG. 1, a torque converter unit which can be combined with other identical units, is composed essentially of three parts. The first part is an impulse-generating mechanism identified by reference numerals beginning with the digit 1 and comprising a shaft 10 provided with a crank 11 to which is pivotally connected a connecting rod 12. If necessary, the shaft 10 can carry a flywheel 13.

The second part is an impulse-receiving mechanism identified by reference numerals beginning with the digit 3 and constituted by a slide 30 pivotally connected to two cranks 31 and 32 carried by freewheel devices 33 and 34 operating in opposite directions and whose outer annuli are in the form of inter-meshing gearwheels.

The third part is an elastic device identified by reference numerals beginning with the digit 2 and constituted by a cylinder 20 and a piston 21, respectively pivotally connected to the connecting rod 12 and fast with the slide 30. This piston-cylinder assembly is guided in a frame 22. The cylinder 20 comprises ports 23. The frame 22 comprises a chamber 24 situated opposite and supplied by a cock 25 whereby the pressure of the gas used as an elastic intermediate means can be regulated. The said cock is connected to an appropriate source of gas under pressure.

Such a converter operates in the following manner.

The receiving mechanism 3 being immobile in the mid-position, the rotation of the shaft 10 causes relative displacement of the cylinder 20 with respect to the piston 21. The pressure in the space between them increases until the driving force exceeds the resistance to movement. Displacement and transmission of energy then occur, and the freewheel devices 33 and 34 direct the said energy in the appropriate directions.

It will be apparent that the force transmitted by the cylinder to the piston at each stroke depends in particular on the mean pressure of the gas.

It is, therefore, possible to influence this force by regulating the mean pressure. Thus the rigidity of the elastic means is used as a variable instead of varying the amplitude of the impulse generator, as is usual, by regulating the eccentricity of the crank web 11, for example. The cock 25 enables the interior of the cylinder 20 to be made to communicate with chambers wherein pressures respectively above and below its mean pressure prevail. There is no gas delivery apart from leakages, and the consumption of the apparatus is very small.

Therefore, the regulation of the mean pressure makes it possible to exercise control over the torque and the speed of the output shafts. The torque conversion ratio thus obtained can vary between 1 and 30.

FIG. 2 shows a modified form of embodiment of a converter unit in which the cylinder is guided by a parallelogram linkage and not by a slide. Components which are the same as those in FIG. 1 are given the same reference numerals, and the method of operation is very similar.

By means of the crank web 11, the shaft 10 drives the connecting rod 12, the slide 14 and the piston 21. The slide 14 is displaced in a guide of appropriate shape which is carried by the cylinder 20.

This cylinder is connected to the frame by an assembly of several cranks which impart to the said cylinder a curved translational movement. The cranks 31 and 32 are fast with the freewheel devices 33 and 34 and communicate to the driven shaft the torque which is transmitted.

A connecting rod 18 of the same length and direction as the cranks 31 and 32 is used for the supply of gas. For this purpose rod 18 is provided with a through bore and fluid-tight oscillatable end joints and it connects the port 23 of the cylinder 20 to a pipe 27. The said pipe can be connected by the cock 25b to the atmosphere and by the cock 25a to a source of compressed air or any compressed gas, for example a bottle 26 provided with a pressure reducer 29.

The method of operation is identical to that of the torque converter shown in FIG. 1. The cocks 25a and 25b make it possible to increase or decrease the mean pressure in the piston-cylinder assembly and thus to regulate the value of the individual impulses corresponding to a given torque.

What is claimed is:
1. In a variable torque converter having rotary torque input means and rotary driven torque output means, the improvement which comprises, pneumatic means driven from said torque input means for variably controlling and adjusting the ratio of transmissible torque transmitted from said torque input means to said torque output means comprising movable cylinder and a double-acting piston in said cylinder both relatively movable axially continuously in operation and connected continuously to a respective one of said torque input and output means for continuous axial travel relative to each other, and means for variably applying fluid under pressure internally of said cylinder directly to both sides of said piston thereby to elastically vary the torque transmitted from said input means to said output means through a multiplicity of possible ratios of transmissible torque transmission.

2. In a variable torque converter having rotary torque input means and rotary driven torque output means, the improvement which comprises pneumatic means for variably controlling and adjusting the ratio of transmissible torque transmitted from said torque input means to said torque output means comprising a movable cylinder and a reciprocable double-acting piston in said cylinder both relatively movable, continuously in operation, means for driving said cylinder axially reciprocably from said torque input means continuously in operation, means connecting said piston to said torque output means, and means for variably applying a gaseous fluid under pressure internally of said cylinder directly to both sides of said piston thereby to elastically vary the torque transmitted from said input means to said output means.

References Cited in the file of this patent

UNITED STATES PATENTS

| | | |
|---|---|---|
| 264,859 | Buterfield | Sept. 26, 1882 |
| 577,445 | Newman et al. | Feb. 23, 1897 |
| 903,372 | Gardner | Nov. 10, 1908 |
| 1,024,669 | Behr | Apr. 30, 1912 |
| 1,549,854 | Coffman | Aug. 18, 1925 |
| 1,813,614 | Franks | July 7, 1931 |